US005915234A

United States Patent [19]
Itoh

[11] Patent Number: 5,915,234
[45] Date of Patent: Jun. 22, 1999

[54] METHOD AND APPARATUS FOR CELP CODING AN AUDIO SIGNAL WHILE DISTINGUISHING SPEECH PERIODS AND NON-SPEECH PERIODS

[75] Inventor: Katsutoshi Itoh, Tokyo, Japan

[73] Assignee: Oki Electric Industry Co., Ltd., Tokyo, Japan

[21] Appl. No.: 08/701,480

[22] Filed: Aug. 22, 1996

[30] Foreign Application Priority Data

Aug. 23, 1995 [JP] Japan .................................... 7-214517

[51] Int. Cl.[6] ........................................................ G01L 5/00

[52] U.S. Cl. ........................... 704/219; 704/226; 704/233

[58] Field of Search ..................................... 704/219, 226, 704/253, 233, 261, 217; 364/513; 84/622

[56] References Cited

U.S. PATENT DOCUMENTS

| | | | |
|---|---|---|---|
| 4,230,906 | 10/1980 | Davis | 704/219 |
| 4,720,802 | 1/1988 | Damoulakis | 364/513 |
| 4,920,568 | 4/1990 | Kamiya et al. | 704/233 |
| 5,248,845 | 9/1993 | Massie | 84/622 |
| 5,307,441 | 4/1994 | Tzeng | 704/219 |
| 5,327,520 | 7/1994 | Chen | 704/219 |
| 5,572,623 | 11/1996 | Pastor | 704/253 |
| 5,602,961 | 2/1997 | Kolesnik et al. | 704/219 |
| 5,615,298 | 3/1997 | Chen | 704/226 |
| 5,657,350 | 8/1997 | Hofmann | 704/219 |
| 5,657,420 | 8/1997 | Jacobs et al. | 704/261 |
| 5,659,658 | 8/1997 | Vanska | 704/261 |
| 5,692,101 | 11/1997 | Gerson et al. | 704/226 |
| 5,749,067 | 5/1998 | Barrett | 704/233 |

FOREIGN PATENT DOCUMENTS

| | | |
|---|---|---|
| 0 654 909 A1 | 5/1995 | European Pat. Off. . |
| 0 660 301 A1 | 6/1995 | European Pat. Off. . |
| 05-16550 | 7/1993 | Japan . |
| 5-165497 | 7/1993 | Japan . |
| 6-130995 | 5/1994 | Japan . |
| 6-130998 | 5/1994 | Japan . |

OTHER PUBLICATIONS

Furui, Digital speech processing, synthesis and recognition, 1989.

Guan et al., "A Power–Conserved Real–Time Speech Coder at Low Bit Rate", Discovering a New World of Communications, Chicago, Jun. 14–18, 1992, vol. 1 of 4, Jun. 14, 1992, Institute of Electrical Electronics Engineers, pp. 62–62.

Sunwoo et al., "Real–Time Implementation of the VSELP on a 16–Bit DSP Chip", IEEE Transactions on Consumer Electronics, vol. 37, No. 4, Nov. 1, 1991, pp. 772–782.

"Vector Sum Excited Linear Prediction (VSELP) Speech Coding at 8kbps", Gerson and Jasiuk, IEEE ICASSP, 1990, pp. 461–464.

*Primary Examiner*—David R. Hudspeth
*Assistant Examiner*—Daniel Abebe
*Attorney, Agent, or Firm*—Rabin & Champagne, P.C.

[57] ABSTRACT

For the CELP (Code Excited Linear Prediction) coding of an input audio signal, an autocorrelation matrix, a speech/noise decision signal and a vocal tract prediction coefficient are fed to an adjusting section. In response, the adjusting section computes a new autocorrelation matrix based on the combination of the autocorrelation matrix of the current frame and that of a past period determined to be a noise. The new autocorrelation matrix is fed to an LPC (Linear Prediction Coding) analyzing section. The analyzing section computes a vocal tract prediction coefficient based on the autocorrelation matrix and delivers it to a prediction gain computing section. At the same time, in response to the above new autocorrelation matrix, the analyzing section computes an optimal vocal tract prediction coefficient by correcting the vocal tract prediction coefficient. The optimal vocal tract prediction coefficient is fed to a synthesis filter.

55 Claims, 5 Drawing Sheets

METHOD AND APPARATUS FOR CELP CODING AN AUDIO SIGNAL WHILE DISTINGUISHING SPEECH PERIODS AND NON-SPEECH PERIODS

BACKGROUND OF THE INVENTION

1. Field of the Invention

The present invention relates to a CELP (Code Excited Linear Prediction) coder and, more particularly, to a CELP coder giving consideration to the influence of an audio signal in non-speech signal periods.

2. Description of the Background Art

It has been customary with coding and decoding of speech to deal with speech periods and non-speech periods equivalently. Non-speech periods will often be referred to as noise periods hereinafter simply because noises are conspicuous, compared to speech periods. A speech decoding method is disclosed in, e.g., Gerson and Jasiuk "VECTOR SUM EXCITED LINEAR PREDICTION (VSELP) SPEECH CODING AT 8 kbps", Proc. IEEE ICASSP, 1990, pp. 461–464. This document pertains to a VSELP system which is the standard North American digital cellular speech coding system.

Japanese digital cellular speech coding systems also adopt a system similar to the VSELP system.

However, a CELP coder has the following problem because it attaches importance to a speech period coding characteristic. When a noise is coded by the speech period coding characteristic of the CBLP coder and then decoded, the resulting synthetic sound sounds unnatural and a nnoying. Specifically, codebooks used as excitation sources are optimized for speech. In addition, a spectrum estimation e rror derived from LPC (Linear Prediction Coding) analysis differs from one frame to another frame. For these reasons, the noise periods of synthetic sound coded by the CELP coder and then decoded are much removed from the original noise, deteriorating commun ication quality.

SUMMARY OF THE INVENTION

It is therefore an object of the present invention to provide a method and a device for CELP coding an audio signal and capable of reducing the influence of an audio signal (noises including one ascribable to revolution and one ascribable to vibration) on a coded output, thereby enhancing desirable speech reproduction.

In accordance with the present invention, a method of CELP coding an input audio signal begins with the step of classifying the input acoustic signal into a speech period and a noise period frame by frame. A new autocorrelation matrix is computed based on the combination of an autocorrelation matrix of a current noise period frame and an autocorrelation matrix of a previous noise period of frame. LPC analysis is performed with the new autocorrelation matrix. A synthesis filter coefficient is determined based on the result of the LPC analysis, quantized, and then sent. An optimal codebook vector is searched for based on the quantized synthetic filter coefficient.

Also, in accordance with the present invention, a method of CELP coding an input audio signal begins with the step of determining whether the input audio signal is speech or noise subframe by subframe. An autocorrelation matrix of a noise period is computed. LPC analysis is performed with the autocorrelation matrix. A synthesis filter coefficient is determined based on the result of the LPC analysis, quantized, and then sent. An amount of noise reduction and a noise reducing method are selected on the basis of the speech/noise decision. A target signal vector is computed by the noise reducing method selected. An optimal codebook vector is searched for by use of the target signal vector.

Further, in accordance with the present invention, an apparatus for CELP coding an input audio signal has an autocorrelation analyzing section for producing autocorrelation information from the input audio signal. A vocal tract prediction coefficient analyzing section computes a vocal tract prediction coefficient from the result of analysis output from the autocorrelation analyzing section. A prediction gain coefficient analyzing section computes a prediction gain coefficient from the vocal tract prediction coefficient. An autocorrelation adjusting section detects a non-speech signal period on the basis of the input audio signal, vocal tract prediction coefficient and prediction gain coefficient, and adjusts the autocorrelation information in the non-speech signal period. A vocal tract prediction coefficient correcting section produces from the adjusted autocorrelation information a corrected vocal tract prediction coefficient having the corrected vocal tract prediction coefficient of the non-speech signal period. A coding section CELP codes the input audio signal by using the corrected vocal tract prediction coefficient and an adaptive excitation signal.

Furthermore, in accordance with the present invention, an apparatus for CELP coding an input audio signal has an autocorrelation analyzing section for producing autocorrelation information from the input audio signal. A vocal tract prediction coefficient analyzing section computes a vocal tract prediction coefficient from the result of analysis output from the autocorrelation analyzing section. A prediction gain coefficient analyzing section computes a prediction gain coefficient from the vocal tract prediction coefficient. An LSP (Linear Spectrum Pair) coefficient adjusting section computes an LSP coefficient from the vocal tract prediction coefficient, detects a non-speech signal period of the input audio signal from the input audio signal, vocal tract prediction coefficient and prediction gain coefficient, and adjusts the LSP coefficient of the non-speech signal period. A vocal tract prediction coefficient correcting section produces from the adjusted LSP coefficient a corrected vocal tract prediction coefficient having the corrected vocal tract prediction coefficient of the non-speech signal period. A coding section CELP codes the input audio signal by using the corrected vocal tract coefficient and an adaptive excitation signal.

Moreover, in accordance with the present invention, an apparatus for CELP coding an input audio signal has an autocorrelation analyzing section for producing autocorrelation information from the input audio signal. A vocal tract prediction coefficient analyzing section computes a vocal tract prediction coefficient from the result of analysis output from the autocorrelation analyzing section. A prediction gain coefficient analyzing section computes a prediction gain coefficient from the vocal tract prediction coefficient. A vocal tract coefficient adjusting section detects a non-speech signal period on the basis of the input audio signal, vocal tract prediction coefficient and prediction gain coefficient, and adjusts the vocal tract prediction coefficient to thereby output an adjusted vocal tract prediction coefficient. A coding section CELP codes the input audio signal by using the adjusted vocal tract prediction coefficient and an adaptive excitation signal.

In addition, in accordance with the present invention, an apparatus for CELP coding an input audio signal has an autocorrelation analyzing section for producing autocorrelation information from the input audio signal. A vocal tract prediction coefficient analyzing section computes a vocal tract tract prediction coefficient from the result of analysis output from the autocorrelation analyzing section. A prediction gain coefficient analyzing section computes a prediction gain coefficient from the vocal tract prediction coefficient. A noise cancelling section detects a non-speech signal period on the basis of bandpass signals produced by bandpass filtering the input audio signal and the prediction gain coefficient, performs signal analysis on the non-speech signal period to thereby generate a filter coefficient for noise cancellation, and performs noise cancellation with the input audio signal by using said filter coefficient to thereby generate a target signal for the generation of a synthetic speech signal. A synthetic speech generating section generates the synthetic speech signal by using the vocal tract prediction coefficient. A coding section CELP codes the input audio signal by using the vocal tract prediction coefficient and target signal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Preferred embodiments of the method and apparatus for the CELP coding of an audio signal in accordance with the present invention will be described hereinafter. Briefly, in accordance with the present invention, whether an input signal is a speech or a noise is determined frame by by frame. Then, a synthesis filter coefficient is adjusted on the basis of the result of decision and by use of an autocorrelation matrix, an LSP (Linear Spectrum Pair) coefficient or a direct prediction coefficient, thereby reducing unnatural sounds during noise or unvoiced periods as distinguished from speech or voiced periods. Alternatively, in accordance with the present invention, whether an input signal is a speech or a noise is determined on a subframe-by-subframe basis. Then, a target signal for the selection of an optimal codevector is filtered on the basis of the result of decision, thereby reducing noise.

Figure 1:
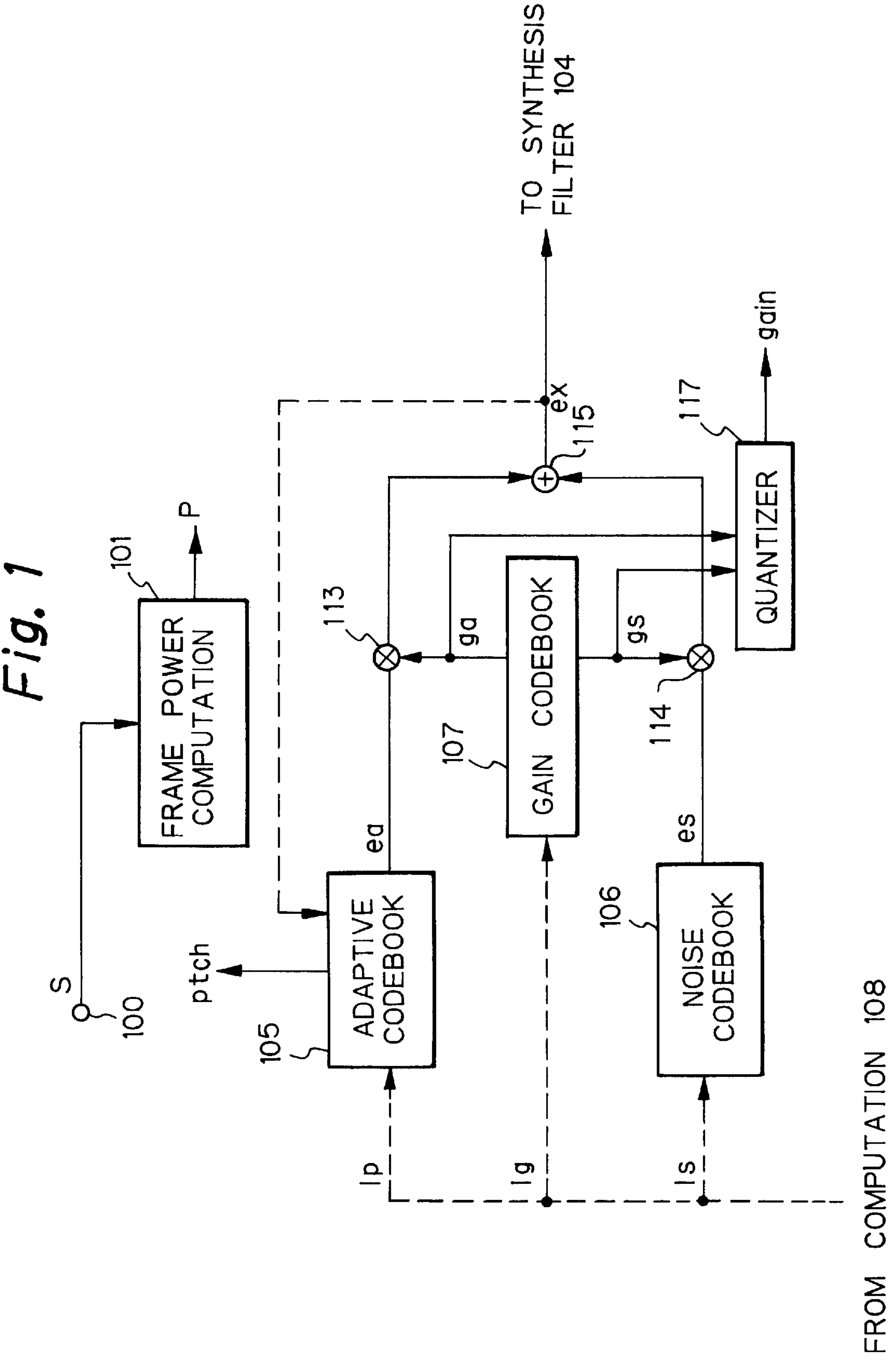
FIGS. 1 and 2 are schematic block diagrams showing, when combined, a CELP coder embodying the present invention.
Figure 2:
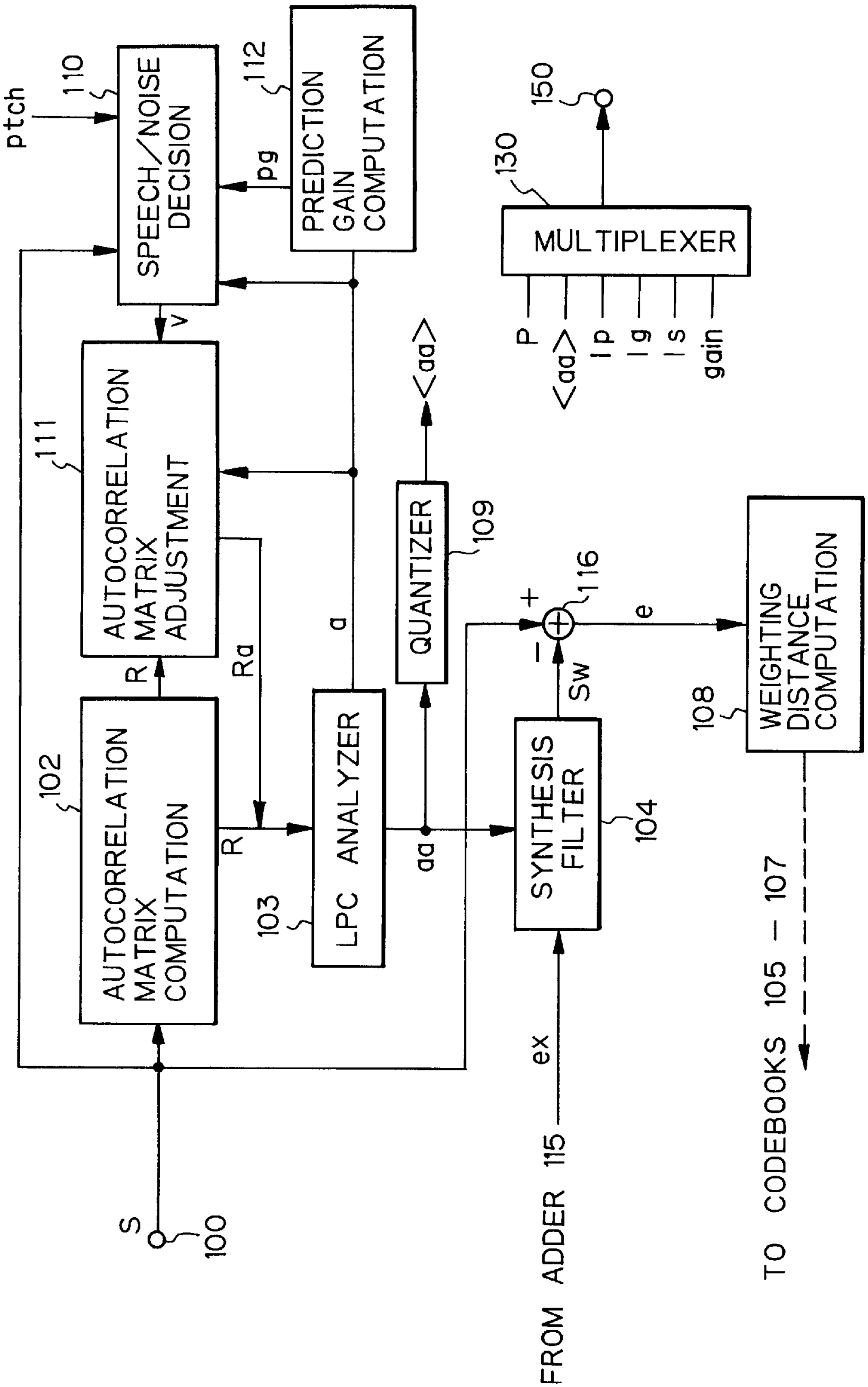

Referring to FIGS. 1 and 2, a CELP coder embodying the present invention is shown. This embodiment is implemented as an CELP speech coder of the type reducing unnatural sounds during noise or unvoiced periods. Briefly, the embodiment classifies input signals into speech and noise frame by frame, calculates a new autocorrelation matrix based on the combination of the autocorrelation matrix of the current noise frame and that of the previous noise frame, performs LPC analysis with the new matrix, determines a synthesis filter coefficient, quantizes it, and sends the quantized coefficient to a decoder. This allows a decoder to search for an optimal codebook vector using the synthesis filter coefficient.

As shown in FIGS. 1 and 2, the CELP coder directed toward the reduction of unnatural sounds receives a digital speech signal or speech vector signal S in the form of a frame on its input terminal 100. The coder transforms the speech signal S to a CELP code and sends the CELP code as coded data via its output terminal 150. Particularly, this embodiment is characterized in that a vocal tract coefficient, produced by an autocorrelation matrix computation 102, a speech/noise decision block 110, an autocorrelation matrix adjustment 111 and an LPC analyzer 103, is corrected. A conventional CELP coder has coded noise periods, as distinguished from speech or voiced periods, and eventually reproduced annoying sounds. With the above correction of the vocal tract coefficient, the embodiment is free from such a problem.

Specifically, the digital speech signal or speech vector signal S received at the input port 100 is fed to a frame power computation block 101. In response, the frame power computation block 101 computes power frame by frame and delivers it to a multiplexer 130 as a frame power signal P. The frame-by-frame input signal S is also applied to the autocorrelation matrix computation block 102. This computation block 102 computes, based on the signal S, an autocorrelation matrix R for determining a vocal tract coefficient and feeds it to the LPC analyzer 103 and autocorrelation matrix adjustment block 111.

The LPC analyzer 103 produces a vocal tract prediction coefficient a from the autocorrelation matrix R and delivers it to a prediction gain computation block 112. Also, on receiving an autocorrelation matrix Ra from the adjustment block 111, the LPC analyzer 103 corrects the vocal tract prediction coefficient a with the matrix Ra, thereby outputting an optimal vocal tract prediction coefficient aa. The optimal prediction coefficient aa is fed to a synthesis filter 104 and an LSP quantizer 109.

The prediction gain computation block 112 transforms the vocal tract prediction coefficient a to a reflection coefficient, produces a prediction gain from the reflection coefficient, and feeds the prediction gain to the speech/noise decision block 110 as a prediction gain signal pg. A pitch coefficient signal ptch is also applied to the speech/noise decision block 110 from an adaptive codebook 105 which will be described later. The decision block 110 determines whether the current frame signal S is a speech signal or a noise signal on the basis of the signal S, vocal tract prediction coefficient a, and prediction gain signal pg. The decision block 110 delivers the result of decision, i.e., a speech/noise decision signal v to the autocorrelation matrix adjustment block 111.

The autocorrelation matrix adjustment block 111, among the others, is an essential feature of this illustrated embodiment and implements processing to be executed only when the input signal S is determined to be a noise signal. On receiving the speech/noise decision signal v and vocal tract prediction coefficient a, the adjustment block 111 determines a new autocorrelation matrix Ra based on the combination of the autocorrelation matrix of the current noise frame and that of the past frame determined to be noise. The autocorrelation matrix Ra is fed to the LPC analyzer 103.

The adaptive codebook 105 stores data representative of a plurality of periodic adaptive excitation vectors beforehand. A particular index number Ip is assigned to each of the adaptive excitation vectors. When an optimal index number Ip is fed from a weighting distance computation block 108, which will be described, to the codebook 105, the codebook 105 delivers an adaptive excitation vector signal e a designated by the index number Ip to a multiplier 113. At the same time, the codebook 105 delivers the previously mentioned pitch signal ptch to the speech/noise decision block 110. The pitch signal ptch is representative of a normalized autocorrelation between the input signal S and the optimal adaptive excitation vector signal ea. The vector data stored in the codebook 105 are updated by an optimal excitation vector signal exOP derived from the excitation vector signal ex output from an adder 115.

The illustrated embodiment includes a noise codebook 106 storing data representative of a plurality of noise excitation vectors beforehand. A particular index number Is is assigned to each of the noise excitation vector data. The noise codebook 106 produces a noise excitation vector signal es designated by an optimal index number Is output from the weighting distance computation block 108. The vector signal es is fed from the codebook 106 to a multiplier 114.

The embodiment further includes a gain codebook 107 storing gain codes respectively corresponding to the adaptive excitation vectors and noise excitation vectors beforehand. A particular index Ig is assigned to each of the gain codes. When an optimal index number Ig is fed from the weighting distance computation 108 to the codebook 107, the codebook 107 outputs a gain code signal ga for an adaptive excitation vector signal or feeds a gain code signal gs for a noise excitation vector signal. The gain code signals ga and gs are fed to the multipliers 113 and 114, respectively.

The multiplier 113 multiplies the adaptive excitation vector signal ea and gain code signal ga received from the adaptive codebook 105 and gain codebook 107, respectively. The resulting product, i.e., an adaptive excitation vector signal with an optimal magnitude is fed to the adder 115. Likewise, the multiplier 114 multiplies the noise excitation vector signal es and gain code signal gs received from the noise code book 106 and gain codebook 107, respectively. The resulting product, i.e., a noise excitation vector signal with an optimal magnitude is also fed to the adder 115. The adder 115 adds the two vector signals and feeds the resulting excitation vector signal ex to the synthesis filter 104. At the same time, the adder 115 feeds back the previously mentioned optimal excitation vector signal exOP to the adaptive codebook 105, thereby updating the codebook 105. The above vector signal exOP causes a square sum computed by the weighting distance computation 108 to be a minimum value.

The synthesis filter 104 is implemented by an IIR (Infinite Impulse Response) digital filter by way of example. The filter 104 generates a synthetic speech vector signal (synthetic speech signal) Sw from the corrected optimal vocal tract prediction coefficient aa and excitation vector (excitation signal) ex received from the LPC analyzer 103 and adder 115, respectively. The synthetic speech vector signal Sw is fed to one input (−) of a subtracter 116. Stated another way, the IIR digital filter 104 filters the excitation vector signal ex to output the synthetic speech vector signal Sw, using the corrected optimal vocal tract prediction coefficient aa as a filter (tap) coefficient. Applied to the other input (+) of the subtracter 116 is the auto input digital speech signal S via the input port 100. The subtracter 116 performs subtraction with the synthetic speech vector signal Sw and audio signal S and delivers the resulting difference to the weighting distance computation block 108 as an error vector signal e.

The weighting distance computation block 108 weights the error vector signal e by frequency conversion and then produces the square sum of the weighted vector signal. Subsequently, the computation block 108 determines optimal index numbers Ip, Is and Ig respectively corresponding to the optimal adaptive excitation vector signal, noise excitation vector signal and gain code signal and capable of minimizing a vector signal E derived from the above square sum. The optimal index numbers Ip, Is and Ig are fed to the adaptive codebook 105, noise codebook 106, and gain codebook 107, respectively.

The two outputs ga and gs of the gain codebook 107 are provided to the quantizer 117. The quantizer 117 quantizes the gain code ga or gs to output a gain code quantized signal gain and feeds it to the multiplexer 130. The illustrated embodiment has another quantizer 109. The quantizer 109 LSP-quantizes the vocal tract prediction coefficient aa optimally corrected by the noise cancelling procedure, thereby feeding a vocal tract prediction coefficient quantized signal <aa> to the multiplexer 130.

The multiplexer 130 multiplexes the frame power signal P, gain code quantized signal gain, vocal tract prediction coefficient quantized signal <aa>, index Ip for adaptive excitation vector selection, index Ig for gain code selection, and index Is for noise excitation vector selection. The multiplexer 130 sends the mutiplexed data via the output 150 as coded data output from the CELP coder.

In operation, the frame power computation block 101 determines on a frame-by-frame basis the power of the digital speech signal received at the input terminal 100, while delivering the frame power signal P to the multiplexer 130. At the same time, the autocorrelation matrix computation block 102 computes the autocorrelation matrix R of the input signal S and delivers it to the autocorrelation matrix adjustment block 111. Further, the speech/noise decision block 110 determines whether the input signal S is a speech signal or a noise signal, using the pitch signal ptch, vocal tract prediction coefficient a, and prediction gain signal pg.

The LPC analyzer 103 determines the vocal tract prediction coefficient a on the basis of the autocorrelation matrix R received from the autocorrelation matrix computation block 102. The prediction gain computation block 112 produces the prediction gain signal pg from the prediction coefficient a. These signals a and pg are applied to the speech/noise decision block 110. The decision block 110 determines, based on the pitch signal ptch received from the adaptive codebook 105, vocal tract prediction coefficient a, prediction gain signal pg and input speech signal S, whether the signal S is speech or noise. The decision block 110 feeds the resulting speech/noise signal v to the autocorrelation matrix adjustment block 111.

On receiving the autocorrelation matrix R, vocal tract prediction coefficient a and speech/noise decision signal v, The autocorrelation matrix adjustment block 111 produces a new autocorrelation matrix Ra based on the combination of the autocorrelation matrix of the current frame and that of the past frame determined to be noise. As a result, the autocorrelation matrix of a noise portion which has conventionally been the cause of an annoying sound is optimally corrected.

The new autocorrelation matrix Ra is applied to the LPC analyzer 103. In response, the analyzer 103 produces a new optimal vocal tract prediction coefficient aa and feeds it to the synthesis filter 104 as a filter coefficient for an IIR digital filter. The synthesis filter 104 filters the excitation vector signal ex by use of the optimal prediction coefficient aa, thereby outputting a synthetic speech vector signal Sw.

The subtracter 116 produces a difference between the input audio signal S and the synthetic speech vector signal Sw and delivers it to the weighting distance computation block 108 as an error vector signal e. In response, the computation block 108 converts the frequency of the error vector signal e and then weights it to thereby produce optimal index numbers Ia, Is and Ig respectively corresponding to an optimal adaptive excitation vector signal, noise excitation vector signal and gain code signal which will minimize the square sum vector signal E. The optimal index numbers Ip, Is and Ig are fed to the multiplexer 130. At the same time, the index numbers Ip, Is and Ig are applied to the adaptive codebook 105, noise codebook 106 and gain codebook 107 in order to obtain optimal excitation vectors ea and es and an optimal gain code signal ga or gs.

The multiplier 113 multiplies the adaptive excitation vector signal e a designated by the index number Ip and read out of the adaptive codebook 105 by the gain code signal ga designated by the Index number Ig and read out of the gain codebook 107. The output signal of the multiplier 113 is fed to the adder 115. On the other hand, the multiplier 114 multiplies the noise excitation vector signal es read out of the noise codebook 106 in response to the index number Is by the gain code gs read out of the gain codebook 107 in response to the index number Ig. The output signal of the multiplier 114 is also fed to the adder 1 15. The adder 115 adds the two input signals and applies the resulting sum or excitation vector signal ex to the synthesis filter 104. As a result, the synthesis filter 104 outputs a synthetic speech vector signal Sw.

As stated above, the synthetic speech vector signal Sw is repeatedly generated by use of the adaptive codebook 105, noise codebook and gain codebook 107 until the difference between the signal Sw and the input speech signal decreases to zero. For periods other than speech or voiced periods, the vocal tract prediction coefficient aa is optimally corrected to produce the synthetic speech vector signal Sw.

The multiplexer 130 multiplexes the frame power signal P, gain code quantized signal gain, vocal tract prediction coefficient quantized signal <aa>, index number Ip for adaptive excitation vector selector, index number Ig for gain code selection and index number Is for noise excitation vector selection every moment, thereby outputting coded data.

The speech/noise decision block 110 will be described in detail. The decision block 110 detects noise or unvoiced periods, using a frame pattern and parameters for analysis. First, the decision block 110 transforms the parameters for analysis to reflection coefficients r[i] where i=1, . . . , Np which is the degree of the filter. With a stable filter, we have the condition, $-1.0<r[i]<1.0$. By using the reflection coefficients r[i], a prediction gain RS may be expressed as:

$$RS=\Pi(1.0-r[i]^2) \qquad \text{Eq. (1)}$$

where i=1, . . . , Np.

The reflection coefficient r[0] is representative of the inclination of the spectrum of an analysis frame signal; as the absolute value |r0| approaches zero, the spectrum becomes more flat. Usually, a noise spectrum is less inclined than a speech spectrum. Further, the prediction gain RS is close to zero in speech or voiced periods while it is close to 1.0 in noise or unvoiced periods. In addition, in a hand-held phone or similar apparatus using the CELP coder, the frame power is great in voiced periods, b u t small in unvoiced periods, because the user's mouth or speech source and a microphone or signal input section are close to each other. It follows that a speech and a noise can be distinguished by use of the following equation:

$$D=Pow\cdot|r[0]|/Rs \qquad \text{Eq. (2)}$$

A frame will be determined to be a speech if D is greater than Dth or determined to be a noise if D smaller than Dth.

The autocorrelation matrix adjustment block 111 will be described in detail. The adjustment block 111 corrects the autocorrelation matrix R when the past m consecutive frames were continuously determined to be noise. Assume that the current frame and the frame occurred n frames before the current frame have matrices R[0] and R[n], respectively. Then, the noise period has an adjusted autocorrelation matrix Radj given by:

$$Radj=\Sigma(Wi\cdot R[i]) \qquad \text{Eq. (3)}$$

where i=0 through m−1, ΣWi=1.0, and $Wi \geqq W_{i+1}>0$.

The adjustment block 111 computes the autocorrelation matrix Radj with the above Eq. (3) and delivers it to the LPC analyzer 103.

The illustrative embodiment having the above configuration has the following advantages. Assume that an input signal other than a speech signal is coded by a CELP coder. Then, the result of analysis differs from the actual signal due to the influence of frame-by-frame vocal tract analysis (spectrum analysis). Moreover, because the degree of difference between the result of analysis and the actual signal varies every frame, a coded signal and a decoded signal each has a spectrum different from that of the original speech and is annoying. By contrast, in the illustrative embodiment, an autocorrelation matrix for spectrum estimation is combined with the autocorrelation matrix of the past noise frame. This successfully reduces the degree of difference between frames as to the result of analysis and thereby obviates annoying synthetic sounds. In addition, because a person is more sensitive to varying noises than to constant noises due to the inherent orditory sense, perceptual quality of a noise period can be improved.

Figure 3:
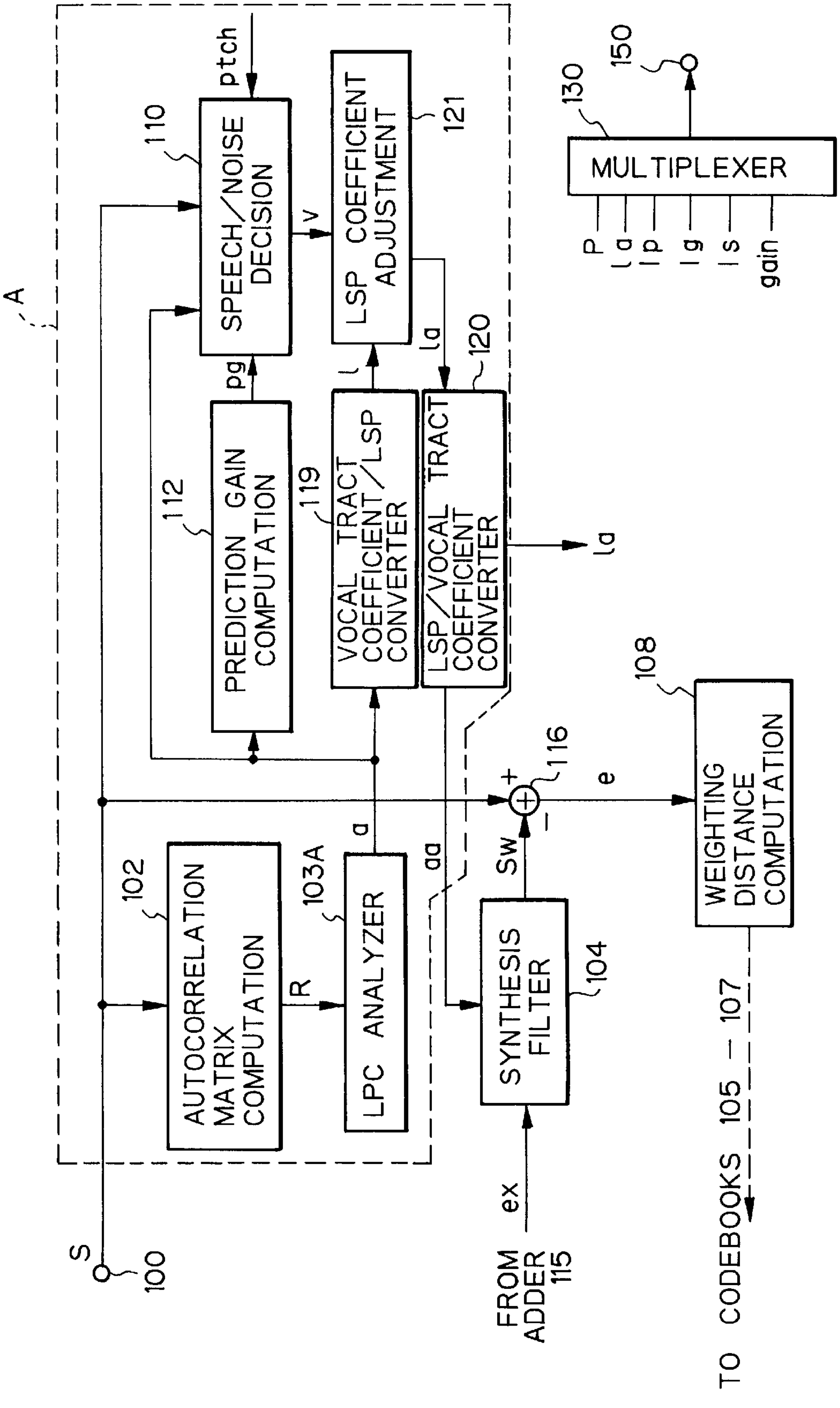
FIG. 3 is a block diagram schematically showing an alternative embodiment of the present invention, particularly a part thereof alternative to the circuitry of FIG. 2.

Referring to FIG. 3, an alternative embodiment of the present invention will be described. FIG. 3 shows only a part of the embodiment which is alternative to the embodiment of FIG. 2. The alternative part is enclosed by a dashed line A in FIG. 3. Briefly, in the alternative embodiment to be described, the synthesis filter coefficient of a noise period is transformed to an LSP coefficient in order to determine the spectrum characteristic of the synthesis filter 104. The determined spectrum characteristic is compared with the spectrum characteristic of the past noise period in order to compute a new LSP coefficient having reduced spectrum fluctuation. The new LSP coefficient is transformed to a synthesis filter coefficient, quantized, and then sent to a decoder. Such a procedure also allows the decoder to search for an optimal codebook vector, using the synthesis filter coefficient.

As shown in FIG. 3, the characteristic part A of the alternative embodiment has an LPC analyzer 103A, a speech/noise decision block 110A, a vocal tract coefficient/LSP converter 119, an LSP/vocal tract coefficient converter 120 and an LSP coefficient adjustment block 121 in addition to the autocorrelation matrix computation block 102 and prediction gain computation block 112. The circuitry shown in FIG. 3, like the circuitry shown in FIG. 2, is combined with the circuitry shown in FIG. 1. Hereinafter will be described how the embodiment corrects a vocal tract coefficient to obviate annoying sounds ascribable to the conventional CELP coding of the noise periods as distinguished from speech periods, concentrating on the unique circuitry A. In FIG. 3, the same circuit elements as the elements shown in FIG. 2 are designated by the same reference numerals.

The vocal tract coefficient/LSP converter 119 transforms a vocal tract prediction coefficient a to an LSP coefficient l and feeds it to the LSP coefficient adjustment block 121. In response, the adjustment block 121 adjusts the LSP coefficient l on the basis of a speech/noise decision signal v received from the speech/noise decision block 110 and the coefficient l, thereby reducing the influence of noise. An adjusted LSP coefficient la output from the adjustment block 121 is applied to the LSP/vocal tract coefficient converter 120. This converter 120 transforms the adjusted LSP coefficient la to an optimal vocal tract prediction coefficient aa and feeds the coefficient aa to the synthesis filter 104 as a digital filter coefficient.

The LSP coefficient adjustment block 121 will be described in detail. The adjustment block 121 adjusts the LSP coefficient only when the past m consecutive frames were determined to be noise. Assume that the current frame has an LSP coefficient LSP−0[i], that the frame occurred n frames before the current frame has a noise period LSP coefficient LSP−n[i], and that the adjusted LSP coefficient is i=1, . . . , Np where Np is the degree of the filter. Then, there holds an equation:

$$LSP_{adj}[i]=\Sigma W_k \cdot LSP-k[i] \qquad \text{Eq. (4)}$$

where k=0 through m−1, $\Sigma W_k$=1.0, i=0 through Np−1, and Wk≧Wk+1≧0.

LSP coefficients belong to the cosine domain. The adjustment block 121 produces an LSP coefficient la with the above equation Eq. (4) and feeds it to the LSP/vocal tract coefficient converter 120.

The operation of this embodiment up to the step of computing the optimal vocal tract prediction coefficient aa will be described because the subsequent procedure is the same as in the previous embodiment. First, the autocorrelation matrix computation block 102 computes an autocorrelation matrix R based on the input digital speech signal S. On receiving the autocorrelation matrix R, the LPC analyzer 103A produces a vocal tract prediction coefficient a and feeds it to the prediction gain computation block 112, vocal tract coefficient/LSP converter 119, and speech/noise decision block 110.

In response, the prediction gain computation block 112 computes a prediction gain signal pg and delivers it to the speech/noise decision block 110. The vocal tract coefficient/LSP converter 119 computes an LSP coefficient l from the vocal tract prediction coefficient a and applies it to the LSP coefficient adjustment block 121. The speech/noise decision block 110 outputs a speech/noise decision signal v based on the input vocal tract prediction coefficient a, speech vector signal S, pitch signal ptch, and prediction gain signal pg. The decision signal v is also applied to the LSP coefficient adjustment block 121. The adjustment 121 adjusts the LSP coefficient l in order to reduce the influence of noise with the previously mentioned scheme. An adjusted LSP coefficient la output from the adjustment block 121 is fed to the LSP/vocal tract coefficient converter 120. In response, the converter 120 transforms the LSP coefficient la to an optimal vocal tract prediction coefficient aa and feeds it to the synthesis filter 104.

As stated above, the illustrative embodiment achieves t h e same advantages as the previous embodiment by adjusting the LSP coefficient directly relating to the spectrum. In addition, this embodiment reduces computation requirements because it does not have to perform LPC analysis twice.

Figure 4:
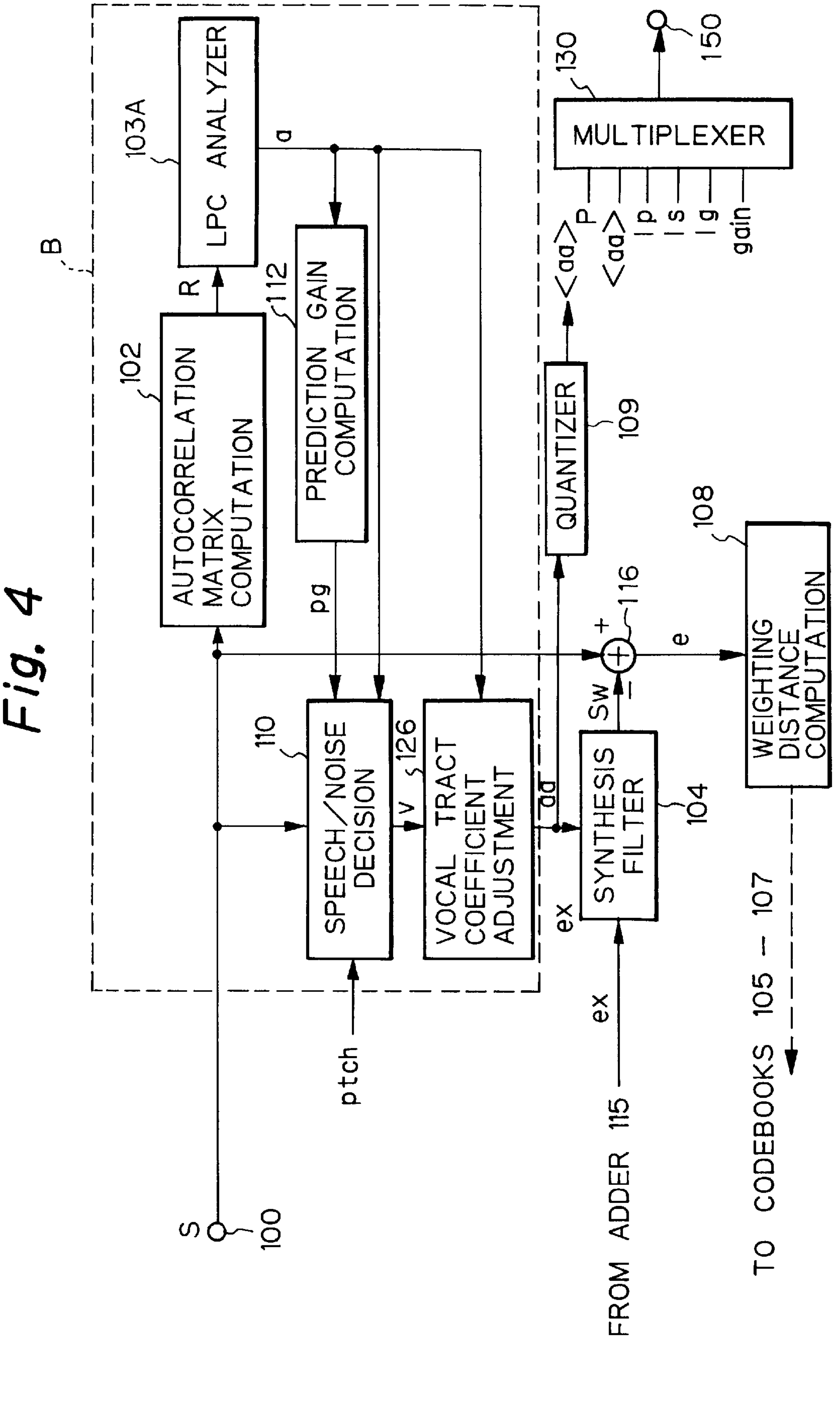
FIG. 4 is a block diagram schematically showing another alternative embodiment of the present invention, particularly a part thereof alternative to the circuitry of FIG. 2.

Referring to FIG. 4, another alternative embodiment of the present invention will be described. FIG. 4 shows only a part of the embodiment which is alternative to the embodiment of FIG. 2. The alternative part is enclosed by a dashed line B in FIG. 4. Briefly, in the alternative embodiment to be described, the noise period synthesis filter coefficient is interpolated with the past noise period synthesis filter coefficient in order to directly compute the new synthesis filter coefficient of the current noise period. The new coefficient is quantized and then sent to a decoder, so that the decoder can search for an optimal codebook vector with the new coefficient.

As shown in FIG. 4, the characteristic part B of this embodiment has an LPC analyzer 103A and a vocal tract coefficient adjustment block 126 in addition to the autocorrelation matrix computation block 102, speech/noise decision block 110, and prediction gain computation block 112. The circuitry shown in FIG. 3 is also combined with the circuitry shown in FIG. 1. The vocal tract coefficient adjustment block 126 adjusts, based on the vocal tract prediction coefficient a received from the analyzer 103A and the speech/noise decision signal v received from the decision block 110, the coefficient a in such a manner as to reduce the influence of noise. An optimal vocal tract prediction coefficient aa output from the adjustment block 126 is fed to the synthesis filter 104. In this manner, the adjustment block 126 determines a new prediction coefficient aa directly by combining the prediction coefficient a of the current period and that of the past noise period.

Specifically, the adjustment block 126 performs the above adjustment only when the past in consecutive frames were determined to be noise. Assume that the synthesis filter coefficient of the current frame is 1−0[i], and that the synthetic filter coefficient of the frame occurred n frames before the current frame is a−n[i]. If i=1, . . . , Np where Np is the degree of the filter, then the adjusted filter coefficient is produced by:

$$a_{adj}[i]=\Sigma W_k \cdot (a-k)[i] \qquad \text{Eq. (5)}$$

where $\Sigma W_k$1.0, $W_k \geqq W_{k+1} \geqq 0$, k=0 through m−1, and i=0 through $N_{p-1}$. At this instant, it is necessary to confirm the stability of the filter used the adjusted coefficient. Preferably, if the filter is determined to be unstable it should be controlled so as not to execute the adjustment.

The operation of this embodiment up to the step of computing the optimal vocal tract prediction coefficient aa will be described because the subsequent procedure is also the same as in the previous embodiment. First, the autocorrelation matrix computation block 102 computes an autocorrelation matrix R based on the input digital speech signal S. On receiving the autocorrelation matrix R, the LPC analyzer 103A produces a vocal tract prediction coefficient a and feeds it to the prediction gain computation block 112, vocal tract coefficient adjustment block 126, and speech/noise decision block 110. The speech/noise decision 110 determines, based on the digital audio signal S, prediction gain coefficient pg, vocal tract prediction coefficient a and pitch signal ptch, whether the signal S is representative of a speech period or a noise period. A speech/noise decision signal v output from the decision block 110 is fed to the vocal tract coefficient adjustment block 126. The adjustment block 126 outputs, based on the decision signal v and prediction coefficient a, an optimal vocal tract prediction coefficient aa so adjusted as to reduce the influence of noise. The optimal coefficient aa is delivered to the synthesis filter 104.

As stated above, the this embodiment also achieves the same advantages as the previous embodiment by combining the vocal tract coefficient of the current period with that of the past noise period. In addition, this embodiment reduces computation requirements because it can directly calculate the filter coefficient.

Figure 5:
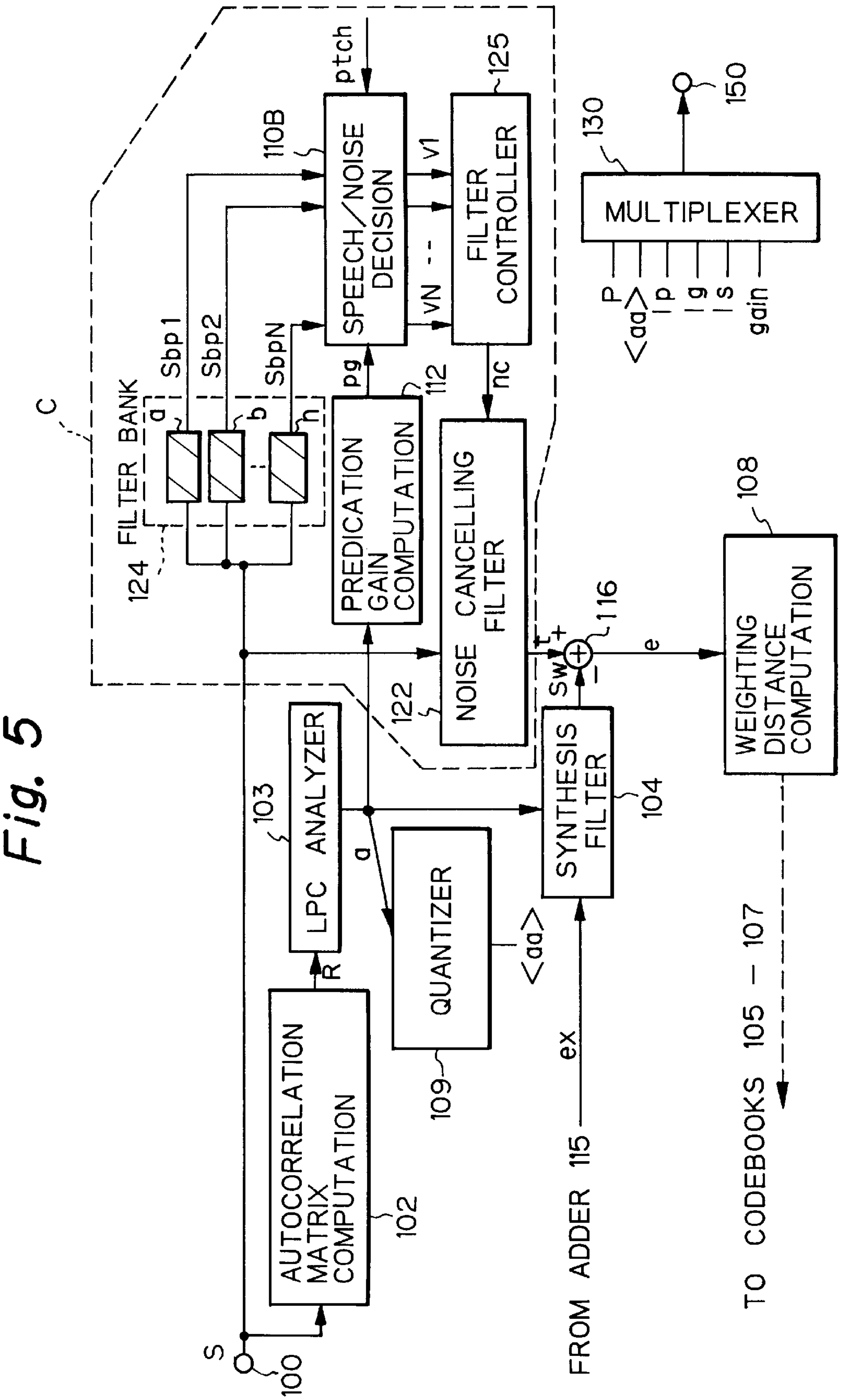
FIG. 5 is a block diagram schematically showing a further alternative embodiment of the present invention, particularly a part thereof alternative to the circuitry of FIG. 2.

A further alternative embodiment of the present invention will be described with reference to FIG. 5. FIG. 5 also shows only a part of the embodiment which is alternative to the embodiment of FIG. 2. The alternative part is enclosed by a dashed line C in FIG. 5. This embodiment is directed toward the cancellation of noise. Briefly, in the embodiment to be described, whether the current period is a speech period or a noise period is determined subframe by subframe. A quantity of noise cancellation and a method for noise cancellation are selected in accordance with the result of the above decision. The noise cancelling method selected is used to compute a target signal vector. Hence, this embodiment allows a decoder to search for an optimal codebook vector with the target signal vector.

As shown in FIG. 5, the unique part C of the speech coder has a speech/noise decision block; and 110B, a noise cancelling filter 122, a filter bank 124 and a filter controller 125 as well as the prediction gain computation block 112. The filter bank 124 consists of bandpass filters a through n each having a particular passband. The bandpass filter a outputs a passband signal SDbp1 in response to the input digital speech signal S. Likewise, the bandpass filter n outputs a passband signal SbpN in response to the speech signal S. This is also true with the other bandpass filters except for the output passband signal. The bandpass signals Sbp1 through SbpN are input to the speech/noise decision block 110B. With the filter bank 124, it is possible to reduce noise in the blocking frequency band and to thereby output a passband signal with an enhanced signal-to-noise ratio. Therefore, the decision block 110B can make a decision for every passband easily.

The prediction gain computation block 112 determines a prediction gain coefficient pg based on the vocal tract prediction coefficient a received from the LPC analyzer 103A. The coefficient pg is applied to the speech/noise decision block 110B. The decision block 110B computes a noise estimation function for every passband on the basis of the passband signals Sbp1–SbpN output from the filter bank 124, pitch signal ptch, and prediction gain coefficient pg, thereby outputting speech/noise decision signals v1–vN. The passband-by-passband decision signals v1–vN are applied to the filter controller 125.

The filter controller 125 adjusts a noise cancelling filter coefficient on the basis of the decision signals v1–vN each showing whether the current period is a voiced or speech period or an unvoiced or noise period. Then, the filter controller 125 feeds an adjusted noise filter coefficient n c to the noise cancelling filter 122 implemented as an IIR or FIR (Finite Impulse Response) digital filter. In response, the filter 122 sets the filter coefficient nc therein and then filters the input speech signal S optimally. As a result, a target signal t with a minimum of noise is output from the filter 122 and fed to the subtracter 116.

The operation of this embodiment up to the step of producing the target signal t will be described because the optimal excitation vector signal ex is generated in the same manner as in FIG. 2. First, the autocorrelation matrix computation block 102 computes an autocorrelation matrix R in response to the input speech signal S. The autocorrelation matrix R is fed to the LPC analyzer 103A. In response, the LPC analyzer 103A produces a vocal tract prediction coefficient a and delivers it to the prediction gain computation block 112 and synthesis filter 104. The computation block 112 computes a prediction gain coefficient pg corresponding to the input prediction coefficient a and feeds it to the speech/noise decision block 110B.

On the other hand, the bandpass filters a–n constituting the filter bank 124 respectively output bandpass signals Sbp1–SbpN in response to the speech signal S. These filter outputs Sbp1–SbpN and the pitch signal ptch and prediction gain coefficient pg are applied to the speech/noise decision block 110B. In response, the decision block 110B outputs speech/noise decision signals v1–vN on a band-by-band basis. The filter controller 125 adjusts the noise cancelling filter coefficient based on the decision signals v1–vN and delivers an adjusted filter coefficient nc to the noise cancelling filter 122. The filter 122 filters the speech signal S optimally with the filter coefficient nc and thereby outputs a target signal t. The subtracter 116 produces a difference e between the target signal t and the synthetic speech signal Sw output from the synthesis filter 104. The difference is fed to the weighting distance computation block 108 as the previously mentioned error signal e. This allows the computation block 108 to search for an optimal index based on the error signal e.

With the above configuration, the embodiment reduces noise in noise periods, compared to the conventional speech coder, and thereby obviates coded signals which would turn out annoying sounds.

As stated above, the illustrative embodiment reduces the degree of unpleasantness in the auditory sense, compared to the case wherein only background noises are heard in speech periods. The embodiment distinguishes a speech period and a noise period during coding and adopts a particular noise cancelling method for each of the two different periods. Therefore, it is possible to enhance sound quality without resorting to complicated processing in speech periods. Further, effecting noise cancellation only with the target signal, the embodiment can reduce noise subframe by subframe. This not only reduces the influence of speech/noise decision errors on speeches, but also reduces the influence of spectrum distortions ascribable to noise cancellation.

In summary, it will be seen that the present invention provides provides a method and an apparatus capable of adjusting the correlation information of an audio signal appearing in a nonspeech signal period, thereby reducing the influence of such an audio signal. Further, the present invention reduces spectrum fluctuation in a non-speech signal period at an LSP coefficient stage, thereby further reducing the influence of the above undesirable audio signal. Moreover, the present invention adjusts a vocal tract prediction coefficient of a non-speech signal period directly on the basis of a speech prediction coefficient. This reduces the influence of the undesirable audio signal on a coded output while reducing computation requirements to a significant degree. In addition, the present invention frees the coded output in a non-speech signal period from the influence of noise because it can generate a target signal from which noise has been removed.

While the present invention has been described with reference to the particular illustrative embodiments, it is not to be restricted by the embodiments. It is to be appreciated that those skilled in the art can change or modify the embodiments without departing from the scope and spirit of the present invention. For example, a pulse codebook may be added to any of the embodiments in order to generate a synthesis speech vector by using a pulse excitation vector as a waveform codevector. While the synthesis filter 104 shown in FIG. 2 is implemented as an IIR digital filter, it may alternatively be implemented as an FIR digital filter or a combined IIR and FIR digital filter.

A statistical codebook may be further added to any of the embodiments. For a specific format and method of generating a statistical codebook, a reference may be made to Japanese patent laid-open publication No. 130995/1994 entitled "Statistical Codebook and Method of Generating the Same" and assigned to the same assignee as the present application. Also, while the embodiments have concentrated on a CELP coder, the present invention is similarly practicable with a decoder disclosed in, e.g., Japanese patent laid-open publication No. 165497/1993 entitled "Code Excited Linear Prediction Coder" and assigned to the same assignee as the present application. In addition, the present invention is applicable not only to a CELP coder but also to a VS (Vector Sum) CELP coder, LD (Low Delay) CELP coder, CS (Conjugate Structure) CELP coder, or PSI CELP coder.

While the CELP coder of any of the embodiment is advantageously applicable to, e.g., a hand-held phone, it is also effectively applicable to, e.g., a TDMA (Time Division Multiple Access) transmitter or receiver disclosed in Japanese patent laid-open publication No. 130998/1994 entitled "Compressed Speech Decoder" and assigned to the same assignee as the present application. In addition, the present invention may advantageously be practiced with a VSELP TDMA transmitter.

While the noise cancelling filter 122 shown in FIG. 5 is implemented as an IIR, FIR or combined IIR and FIR digital filter, it may alternatively be implemented as a Kalman filter so long as statistical signal and noise quantities are available. With a Kalman filter, the coder is capable of operating optimally even when statistical signal and noise quantities are given in a time varying manner.

What is claimed is:

1. A method of CELP coding an input audio signal, comprising the steps of:

(a) classifying the input audio signal into a speech period and a noise period frame by frame on the basis of a result from LPC analysis;

(b) computing a new autocorrelation matrix based on a combination of an autocorrelation matrix of a current noise period frame and an autocorrelation matrix of a previous noise period frame;

(c) performing the LPC analysis with said new autocorrelation matrix;

(d) determining a synthesis filter coefficient based on a result of the LPC analysis, quantizing said synthesis filter coefficient and producing a resulting quantized synthesis filter coefficient, which further includes (i) transforming a synthesis filter coefficient of a noise period to an LSP coefficient;

(ii) determining a spectrum characteristic of a synthesis filter, and comparing said spectrum characteristic with a past spectrum characteristic of said synthesis filter that occurred in a past noise period to thereby produce a new LSP coefficient having reduced spectrum fluctuation; and (iii) transforming said new LSP coefficient to said synthesis filter coefficient; and (e) searching for an optimal codebook vector based on said quantized synthesis filter coefficient.

2. An apparatus for CELP coding an input signal comprising:

autocorrelation analyzing means for producing autocorrelation information from the input audio signal;

vocal tract prediction coefficient analyzing means for computing a vocal tract prediction coefficient from a result of analysis output from said autocorrelation analyzing means;

prediction gain coefficient analyzing means for computing a prediction gain coefficient from said vocal tract prediction coefficient;

autocorrelation adjusting means for detecting a non-speech signal period on the basis of the input audio signal, said vocal tract prediction coefficient and said prediction gain coefficient, and adjusting said autocorrelation information in the non-speech signal period;

vocal tract prediction coefficient correcting means for producing from adjusted autocorrelation information a corrected vocal tract prediction coefficient having said vocal tract prediction coefficient of the non-speech signal period corrected; and coding means for CELP coding the input audio signal by using said corrected vocal tract prediction coefficient and an adaptive excitation signal.

3. An apparatus in accordance with claim 2, wherein said vocal tract prediction coefficient analyzing means and said vocal tract prediction coefficient correcting means perform LPC analysis with said autocorrelation information to thereby output said vocal tract prediction coefficient.

4. An apparatus in accordance with claim 2, wherein said coding means includes an IIR digital filter for filtering said adaptive excitation signal by using said corrected vocal tract prediction coefficient as a filter coefficient.

5. An apparatus in accordance with claim 2, wherein said autocorrelation adjusting means converts the vocal tract prediction coefficient of the input audio signal to a first reflection coefficient r[i], wherein i=1, . . . , Np, where Np represents a degree of a filter, calculates an inclination of a spectrum of the input audio signal to obtain a second reflection coefficient r[o], applies the first reflection coefficient r[i] to a first expression $$RS=\Pi(1.0-r[i]^2)$$

to obtain a prediction gain RS, applies the second reflection coefficient r[o], the prediction gain RS and the prediction gain coefficient Pow to a second expression $$D=Pow*|r[o]|/RS$$

to obtain a value D, where the asterisk * represents a multiplication, and determines the input audio signal as the non-speech signal period if the value D is smaller than a predetermined value Dth.

6. An apparatus for CELP coding an input audio signal, comprising:

autocorrelation analyzing means for producing autocorrelation information from the input audio signal;

vocal tract prediction coefficient analyzing means for computing a vocal tract prediction coefficient from a result of analysis output from said autocorrelation analyzing means;

prediction gain coefficient analyzing means for computing a prediction gain coefficient from said vocal tract prediction coefficient;

LSP coefficient adjusting means for computing an LSP coefficient from said vocal tract prediction coefficient, detecting a non-speech signal period of the input audio signal from the input audio signal, said vocal tract prediction coefficient and said prediction gain coefficient, and adjusting said LSP coefficient of the non-speech signal period;

vocal tract prediction coefficient correcting means for producing from adjusted LSP coefficient a corrected vocal tract prediction coefficient having said vocal tract prediction coefficient of the non-speech signal period corrected; and coding means for CELP coding the input audio signal by using said corrected vocal tract coefficient and an adaptive excitation signal.

7. An apparatus in accordance with claim 6, wherein said vocal tract prediction coefficient analyzing means performs LPC analysis with said autocorrelation information to thereby output said vocal tract prediction coefficient.

8. An apparatus in accordance with claim 6, wherein said coding means includes an IIR digital filter for filtering said adaptive excitation signal by using said corrected vocal tract prediction coefficient as a filter coefficient.

9. An apparatus in accordance with claim 6, wherein said LSP coefficient adjusting means converts the vocal tract prediction coefficient of the input audio signal to a first reflection coefficient r[i], where i=1, . . . , Np, wherein Np represents a degree of a filter, calculates an inclination of a spectrum of the input audio signal to obtain a second reflection coefficient r[o], applies the first reflection coefficient r[i] to a first expression $$RS=\Pi(1.0-r[i]^2)$$

to obtain a prediction gain RS, applies, applies the second reflection coefficient r[o], the prediction gain RS and the prediction gain coefficient Pow to a second expression $$D=Pow*|r[o]|/RS$$

to obtain a value D, wherein the asterisk * represents a multiplication, and determines the input audio signal as the non-speech signal period if the value D is smaller than a predetermined value Dth.

10. An apparatus for CELP coding an input audio signal, comprising:

autocorrelation analyzing means for producing autocorrelation information from the input audio signal;

vocal tract prediction coefficient analyzing means for computing a vocal tract prediction coefficient from a result of analysis output from said autocorrelation analyzing means;

prediction gain coefficient analyzing means for computing a prediction gain coefficient from said vocal tract prediction coefficient;

vocal tract coefficient adjusting means for detecting a non-speech signal period on the basis of the input audio signal, said vocal tract prediction coefficient and said prediction gain coefficient, and adjusting said vocal tract prediction coefficient to thereby output an adjusted vocal tract prediction coefficient;

coding means for CELP coding the input audio signal by using said adjusted vocal tract prediction coefficient and an adaptive excitation signal.

11. An apparatus in accordance with claim 10, wherein said vocal tract prediction coefficient analyzing means performs LPC analysis with said autocorrelation information to thereby output said vocal tract prediction coefficient.

12. An apparatus in accordance with claim 10, wherein said coding means includes an IIR digital filter for filtering said adaptive excitation signal by using said corrected vocal tract prediction coefficient as a filter coefficient.

13. An apparatus in accordance with claim 10, wherein said vocal tract coefficient adjusting means converts the vocal tract prediction coefficient of the input audio signal to a first reflection coefficient r[i], where i=1, . . . , Np, where Np represents a degree of a filter, calculates an inclination of a spectrum of the input audio signal to obtain a second reflection coefficient r[o], applies the first reflection coefficient r[i] to a first expression $$RS=\Pi(1.0-r[i]^2)$$

to obtain a prediction gain RS, applies the second reflection coefficient r[o], the prediction gain RS and the prediction gain coefficient Pow to a second expression $$D=Pow*|r[o]|/RS$$

to obtain a value D, where the asterisk * represents a multiplication, and determines the input audio signal as the non-speech signal period if the value D is smaller than a predetermined value Dth.

14. An apparatus for CELP coding an input audio signal, comprising:

autocorrelation analyzing means for producing autocorrelation information from the input audio signal;

vocal tract prediction coefficient analyzing means for computing a vocal tract prediction coefficient from a result of analysis output from said autocorrelation analyzing means;

prediction gain coefficient analyzing means for computing a prediction gain coefficient from said vocal tract prediction coefficient;

noise cancelling means for detecting a non-speech signal period on the basis of bandpass signals produced by bandpass filtering the input audio signal and said prediction gain coefficient, performing signal analysis on the non-speech signal period to thereby generate a filter coefficient for noise cancellation, and performing noise cancellation with the input audio signal by using said, filter coefficient to thereby generate a target signal for the generation of a synthetic speech signal;

synthetic speech generating means for generating the synthetic speech signal by using said vocal tract prediction coefficient; and coding means for CELP coding the input audio signal by using said vocal tract prediction coefficient and said target signal.

15. An apparatus in accordance with claim 14, wherein said vocal tract prediction coefficient analyzing means performs LPC analysis with said autocorrelation information to thereby output said vocal tract prediction coefficient.

16. An apparatus in accordance with claim 14, wherein said coding means includes an IIR digital filter for filtering said adaptive excitation signal by using said corrected vocal tract prediction coefficient as a filter coefficient.

17. An apparatus in accordance with claim 14, wherein said noise cancelling means includes a plurality of bandpass filters each having a particular passband for filtering the input audio signal.

18. An apparatus in accordance with claim 17, wherein said noise canceling means includes an IIR filter for canceling noise of the input audio signal in accordance with said filter coefficient to thereby generate said target signal.

19. An apparatus in accordance with claim 14, wherein said noise canceling means converts the vocal tract prediction coefficient of the bandpass signals to a first reflection coefficient r[i], where i=1, . . . , Np where Np represents a degree of a filter, calculates an inclination of a spectrum of the bandpass signals to obtain a second reflection coefficient r[o], applies the first reflection coefficient r[i] to a first expression $RS=\Pi(1.0-r[i]^2)$ to obtain a prediction gain RS, applies the second reflection coefficient r[o], the prediction gain RS and the prediction gain coefficient Pow to a second expression $D=Pow*|r[o]|/RS$ to obtain a value D, wherein the asterisk * represents a multiplication, and determines the input audio signal as the non-speech signal period if the value D is smaller than a predetermined value Dth.

20. A method of CELP coding an input audio signal, comprising the steps of:

(a) classifying the input audio signal into a speech period and a noise period frame by frame on the basis of a result from LPC analysis, which further includes (a1) converting a parameter for analysis for the input acoustic signal to a first reflection coefficient r[i], wherein i=1, . . . , Np, where Np represents a degree of filtering;

(a2) calculating an inclination of a spectrum of the input acoustic signal to obtain a second reflection coefficient r[o];

(a3) applying the first reflection coefficient r[i] to a first expression $RS=\Pi(1.0-r[i]^2)$ to obtain an prediction gain RS;

(a4) applying the second reflection coefficient r[o], the prediction gain RS and a prediction gain coefficient Pow to a second expression $D=Pow*|r[o]|/RS$ to obtain a value D, where the asterisk * represents a multiplication; and (a5) determining the input acoustic signal as the noise period if the value D is smaller than a predetermined value Dth;

(b) computing a new autocorrelation matrix based on a combination of an autocorrelation matrix of a current noise period frame and an autocorrelation matrix of a previous noise period frame;

(c) performing the LPC analysis with said new autocorrelation matrix;

(d) determining a synthesis filter coefficient based on a result of the LPC analysis, quantizing said synthesis filter coefficient and producing a resulting quantized synthesis filter coefficient;

(e) searching for an optimal codebook vector based on said quantized synthesis filter coefficient; and (f) coding the input audio signal by using the optimal codebook vector.

21. A method of CELP coding an input audio signal, comprising the steps of:

(a) determining whether the input audio signal is speech or noise subframe by subframe on the basis of a result from LPC analysis, which further includes (a1) converting a vocal tract prediction coefficient of the input audio signal to a first reflection coefficient r[i], where i=1, . . . , Np, where NP represents a degree of filtering;

(a2) calculating an inclination of a spectrum of the input audio signal to obtain a second reflection coefficient r[o];

(a3) applying the first reflection coefficient r[i] to a first expression $RS=\Pi(1.0-r[i]^2)$ to obtain a prediction gain RS;

(a4) applying the second reflection coefficient r[o], the prediction gain RS and a prediction gain coefficient Pow to a second expression $D=Pow*|r[o]|/RS$ to obtain a value D, where the asterisk * represents a multiplication; and (a5) determining the input audio signal as the noise subframe if the value D is smaller than a predetermined value Dth;

(b) computing an autocorrelation m atrix of a noise period;

(c) performing the LPC analysis with said autocorrelation matrix;

(d) determining a synthesis filter coefficient based on a result of the LPC analysis, quantizing said synthesis filter coefficient, and producing a resulting quantized synthesis filter coefficient;

(e) selecting an amount of noise reduction and a noise reducing method on the basis of the speech/noise determining performed in step (a);

(f) computing a target signal vector with the noise reducing method selected;

(g) searching for an optimal codebook vector by using said target signal vector; and (h) coding the input audio signal by using the optimal codebook vector.

22. In a CELP coder, an arrangement comprising:

an autocorrelation matrix calculator which receives an audio input signal and produces an autocorrelation matrix;

an LPC analyzer which receives the autocorrelation matrix from the autocorrelation matrix calculator and produces a first vocal tract prediction coefficient;

a speech/noise decision circuit which receives the first vocal tract prediction coefficient from the LPC analyzer and produces a speech/noise decision signal;

an autocorrelation matrix adjuster which receives the speech/noise decision signal from the speech/noise decision circuit, and provides an adjustment matrix to the LPC analyzer when the decision signal indicates noise;

wherein the LPC analyzer produces a corrected vocal tract prediction coefficient in response to the adjustment matrix; and a synthesis filter which receives the corrected vocal tract prediction coefficient from the LPC analyzer and produces a synthetic speech signal.

23. The arrangement according to claim 22, further comprising:

a prediction gain computation circuit which receives the first vocal tract prediction coefficient and provides a prediction gain signal to the speech/noise decision circuit.

24. The arrangement according to claim 23, further comprising:

a subtracter which receives the audio input signal and the synthetic speech signal from the synthesis filter, and subtracts the synthetic speech signal from the audio input signal to produce an error vector.

25. The arrangement according to claim 24, further comprising:

a quantizer which receives the corrected vocal tract prediction coefficient from the LPC analyzer and produces a quantized vocal tract prediction coefficient signal.

26. The arrangement according to claim 25, further comprising:

a weighting distance computation circuit which receives the error vector from the subtracter and produces a plurality of index signals; and a plurality of codebooks which receive the plurality of index signals from the weighting distance computation circuit and output respective signals in response to the plurality of index signals;

wherein the respective signals output from the plurality of codebooks are used to provide a pitch coefficient signal to the speech/noise decision circuit, and an excitation vector to the synthesis filter.

27. The arrangement according to claim 26, further comprising:

a power computation circuit which receives the input audio signal and produces a power signal; and a multiplexer which receives the power signal from the power computation circuit, the plurality of index signals from the weighting distance computation circuit, and the quantized vocal tract prediction coefficient signal from the quantizer, and produces a CELP coded data signal.

28. The arrangement according to claim 27, further comprising:

a second quantizer which receives at least some of the respective signals from the plurality of codebooks, and provides a gain signal to the multiplexer.

29. The arrangement according to claim 28, wherein the plurality of codebooks comprise:

an adaptive codebook which stores a plurality of adaptation excitation vectors;

a noise codebook which stores a plurality of noise excitation vectors; and a gain codebook which stores a plurality of gain codes.

30. The arrangement according to claim 22, further comprising:

a prediction gain computation circuit which receives the first vocal tract prediction coefficient from the LPC analyzer and provides a prediction gain signal to the speech/noise decision circuit.

31. The arrangement according to claim 30, further comprising:

a vocal tract coefficient/LSP converter, which receives the first vocal tract prediction coefficient and produces an LSP coefficient;

an LSP coefficient adjustment circuit which receives the LSP coefficient from the vocal tract coefficient/LSP converter, and the speech/noise decision signal from the speech/noise decision circuit, and produces an LSP coefficient adjustment signal; and an LSP/vocal tract coefficient converter which receives the LSP coefficient adjustment signal from the LSP coefficient adjustment circuit and produces a vocal tract prediction coefficient.

32. The arrangement according to claim 31, further comprising:

a synthesis filter which receives the vocal tract prediction coefficient from the LSP/vocal tract coefficient converter, and produces a synthetic speech signal.

33. The arrangement according to claim 32, further comprising:

a subtracter which receives the audio input signal and the synthetic speech signal from the synthesis filter, and subtracts the synthetic speech signal from the audio input signal to produce an error vector.

34. The arrangement according to claim 33, further comprising:

a weighting distance computation circuit which receives the error vector from the subtracter and produces a plurality of index signals; and a plurality of codebooks which receive the plurality of index signals from the weighting distance computation circuit and output respective signals in response to the plurality of index signals;

wherein the respective signals output from the plurality of codebooks are used to provide a pitch coefficient signal to the speech/noise decision circuit, and an excitation vector to the synthesis filter.

35. The arrangement according to claim 34, further comprising:

a power computation circuit which receives the input audio signal and produces a power signal; and a multiplexer which receives the power signal from the power computation circuit, and the plurality of index signals from the weighting distance computation circuit, and produces a CELP coded data signal.

36. The arrangement according to claim 35, further comprising:

a quantizer which receives at least some of the respective signals from the plurality of codebooks, and provides a gain signal to the multiplexer.

37. The arrangement according to claim 36, wherein the plurality of codebooks comprise:

an adaptive codebook which stores a plurality of adaptation excitation vectors;

a noise codebook which stores a plurality of noise excitation vectors; and a gain codebook which stores a plurality of gain codes.

38. The arrangement according to claim 30, further comprising:

a vocal tract coefficient adjustment circuit which receives the speech/noise decision signal from the speech/noise decision circuit and the first vocal tract prediction coefficient from the LPC analyzer, and produces a vocal tract prediction coefficient.

39. The arrangement according to claim 38, further comprising:

a synthesis filter which receives the vocal tract prediction coefficient from the vocal tract coefficient adjustment circuit and produces a synthetic speech signal.

40. The arrangement according to claim 39, further comprising:

a subtracter which receives the audio input signal and the synthetic speech signal from the synthesis filter, and subtracts the synthetic speech signal from the audio input signal to produce an error vector.

41. The arrangement according to claim 40, further comprising:

a quantizer which receives the vocal tract prediction coefficient from the vocal tract coefficient adjustment circuit and produces a quantized vocal tract prediction coefficient signal.

42. The arrangement according to claim 41, further comprising:

a weighting distance computation circuit which receives the error vector from the subtracter and produces a plurality of index signals; and a plurality of codebooks which receive the plurality of index signals from the weighting distance computation circuit and output respective signals in response to the plurality of index signals;

wherein the respective signals output from the plurality of codebooks are used to provide a pitch coefficient signal to the speech/noise decision circuit, and an excitation vector to the synthesis filter.

43. The arrangement according to claim 42, further comprising:

a power computation circuit which receives the input audio signal and produces a power signal; and a multiplexer which receives the power signal from the power computation circuit, the plurality of index signals from the weighting distance computation circuit, and the quantized vocal tract prediction coefficient signal from the quantizer, and produces a CELP coded data signal.

44. The arrangement according to claim 43, further comprising:

a second quantizer which receives at least some of the respective signals from the plurality of codebooks, and provides a gain signal to the multiplexer.

45. The arrangement according to claim 44, wherein the plurality of codebooks comprise:

an adaptive codebook which stores a plurality of adaptation excitation vectors;

a noise codebook which stores a plurality of noise excitation vectors; and a gain codebook which stores a plurality of gain codes.

46. In a CELP coder, an arrangement comprising:

an autocorrelation matrix calculator which receives an audio input signal and produces an autocorrelation matrix;

an LPC analyzer which receives the autocorrelation matrix from the autocorrelation matrix calculator and produces a vocal tract prediction coefficient;

a prediction gain computation circuit which receives the vocal tract prediction coefficient from the LPC analyzer and provides a prediction gain signal;

a bank of filters, each of which has a particular passband, receives the audio input signal, and produces a plurality of passband signals; and a speech/noise decision circuit which receives the prediction gain signal from the prediction gain computation circuit and the plurality of passband signals from the bank of filters, and produces a plurality of speech/noise decision signals on the basis of the prediction gain signal and the plurality of passband signals.

47. The arrangement according to claim 46, further comprising:

a filter controller which receives the plurality of speech/noise decision signals from the speech/noise decision circuit and produces an adjusted noise filter coefficient; and a noise canceling filter which receives the adjusted noise filter coefficient from the filter controller and the audio input signal, and produces a minimum noise target signal.

48. The arrangement according to claim 47, further comprising:

a synthesis filter which receives the vocal tract prediction coefficient from the LPC analyzer and produces a synthetic speech signal.

49. The arrangement according to claim 48, further comprising:

a subtracter which receives the minimum noise target signal from the noise canceling filter and the synthetic speech signal from the synthesis filter, and subtracts the synthetic speech signal from the minimum noise target signal to produce an error vector.

50. The arrangement according to claim 49, further comprising:

a quantizer which receives the vocal tract prediction coefficient from the LPC analyzer and produces a quantized vocal tract prediction coefficient signal.

51. The arrangement according to claim 50, further comprising:

a weighting distance computation circuit which receives the error vector from the subtracter and produces a plurality of index signals; and a plurality of codebooks which receive the plurality of index signals from the weighting distance computation circuit and output respective signals in response to the plurality of index signals;

wherein the respective signals output from the plurality of codebooks are used to provide a pitch coefficient signal to the speech/noise decision circuit, and an excitation vector to the synthesis filter.

52. The arrangement according to claim 51, further comprising:

a power computation circuit which receives the input audio signal and produces a power signal; and a multiplexer which receives the power signal from the power computation circuit, the plurality of index signals from the weighting distance computation circuit, and the quantized vocal tract prediction coefficient signal from the quantizer, and produces a CELP coded data signal.

53. The arrangement according to claim 52, further comprising:

a second quantizer which receives at least some of the respective signals from the plurality of codebooks, and provides a gain signal to the multiplexer.

54. The arrangement according to claim 53, wherein the plurality of codebooks comprise:

an adaptive codebook which stores a plurality of adaptation excitation vectors;

a noise codebook which stores a plurality of noise excitation vectors; and a gain codebook which stores a plurality of gain codes.

55. In a CELP coder, an arrangement comprising:

an autocorrelation matrix calculator which receives an audio input signal and produces an autocorrelation matrix;

an LPC analyzer which receives the autocorrelation matrix from the autocorrelation matrix calculator and produces a vocal tract prediction coefficient;

a prediction gain computation circuit which receives the vocal tract prediction coefficient from the LPC analyzer and provides a prediction gain signal;

a bandpass filter which receives the audio input signal, and produces a passband signal;

a speech/noise decision circuit which receives the prediction gain signal from the prediction gain computation circuit and the passband signal from the bandpass filter, and produces a speech/noise decision signal on the basis of the prediction gain signal and the passband signal;

a filter controller which receives the speech/noise decision signal from the speech/noise decision circuit and produces an adjusted noise filter coefficient; and a noise canceling filter which receives the adjusted noise filter coefficient from the filter controller and the audio input signal, and produces a minimum noise target signal.

* * * * *